July 20, 1948.     E. J. VAGIM     2,445,501
HOPPER ASSEMBLY WITH SOLENOID OPERATED GATE Filed March 28, 1945     2 Sheets-Sheet 1

INVENTOR.
E. J. Vagim
BY
*Webster Webster*
ATTYS

July 20, 1948. E. J. VAGIM 2,445,501
HOPPER ASSEMBLY WITH SOLENOID OPERATED GATE
Filed March 28, 1945 2 Sheets-Sheet 2

INVENTOR.
E. J. Vagim
BY
Webster & Webster
ATTYS

UNITED STATES PATENT OFFICE 2,445,501

HOPPER ASSEMBLY WITH SOLENOID OPERATED GATE

Edward J. Vagim, Fresno, Calif.

Application March 28, 1945, Serial No. 585,364

3 Claims. (Cl. 222—459)

This invention is directed to, and it is an object to provide, a novel, electrically controlled hopper assembly adapted to feed materials therefrom and to instantaneously cease such feeding in response to an electric control circuit.

Another object of this invention is to provide a hopper assembly designed particularly for feeding material to an automatic weighing machine wherein the feed to the receiver of the scales must be recurringly interrupted to permit said receiver to be dumped after accumulation of a load of predetermined weight therein.

The present invention, while useful in many industries, is especially adapted to the raisin industry wherein automatic weighing machines are used in connection with the raisin packing operation.

A further object of this invention is to provide a hopper assembly adapted for use with non-free-flowing materials, such as raisins, said assembly including a hopper having a bottom discharge opening and a movable gate operative to control flow through the opening; said hopper being formed so that when the gate is closed and material continues to fall into the hopper from above, such material will not clog the hopper at and adjacent said opening, as would be the tendency in conventional automatic weighing machine hopper assemblies if used with non-free-flowing materials, as above.

An additional object of the invention is to provide a hopper assembly including a hopper having a bottom discharge opening, and a unique solenoid actuated gate unit cooperating with said discharge opening to provide a fast, clean closure of the latter so that cessation of the feed from the hopper assembly is instantaneous, as is desirable.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
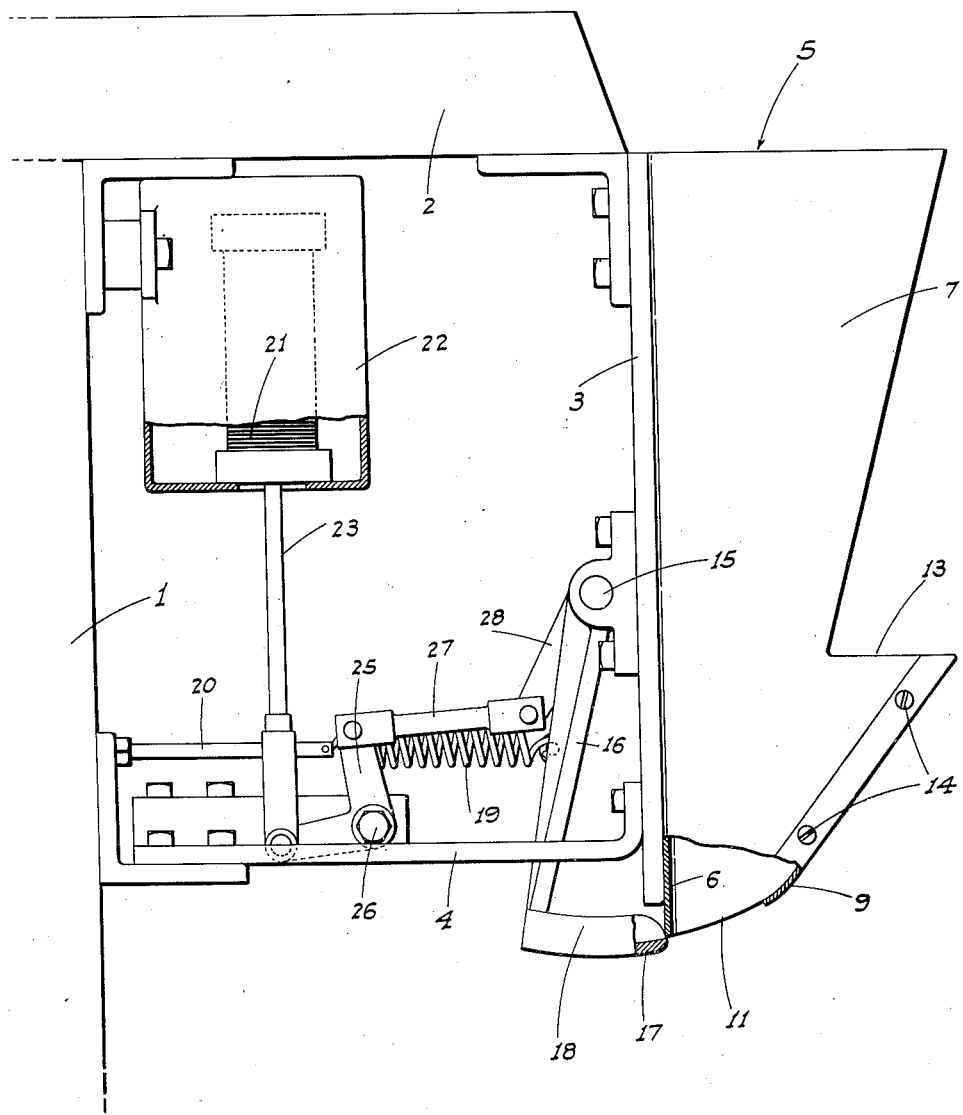
Figure 1 is a side elevation of the hopper assembly, partly in section, illustrating the gate in open position.

Referring now more particularly to the characters of reference on the drawings, the numeral 1 indicates generally an upstanding frame which includes, at the top, a pair of rigid top beams 2 which project forwardly in transversely spaced relation. A pair of transversely spaced rigid front bars 3 are fixed in connection with and depend from the top beams 2 ahead of but parallel to the upstanding frame 1; the front bars 3 being connected adjacent the bottom with the upstanding frame 1 by transversely spaced tie bars 4. The above structure provides in effect a skeleton frame on which the hopper assembly is mounted, and which assembly comprises the following:

A hopper, indicated generally at 5, is fixed in connection with and projects forwardly from the front bars 3; said hopper including a flat vertical back plate 6, side plates 7, an upper front plate 8, and a lower front plate 9.

The upper front plate 8 extends downwardly in converging relation to the back plate 6 and forms a throat 10 therebetween some distance above a bottom discharge opening 11 in the hopper. The lower front plate 9 is disposed with its upper edge in substantially the same horizontal plane as the lower edge of the upper front plate 8, but a considerable distance forwardly of the latter; said lower front plate converging at a relatively easy incline to the forward edge of the discharge opening 11. By reason of the above arrangement of the plates 8 and 9 the front to back depth of the hopper 5 increases directly below the throat 10, providing a relief chamber 12, for the purpose hereinafter described. The relief chamber 12 is provided at the top and in front of the plate 8 with an access opening 13. The lower front plate 9 is detachably mounted on the hopper by means of screws 14, whereby said plate may be readily removed for cleaning the hopper assembly.

The side plates 7 of the hopper are formed, as is obvious, to conform to the varying front to back depth of said hopper, which is due to the particular positioning of the plates 8 and 9.

Figure 2:
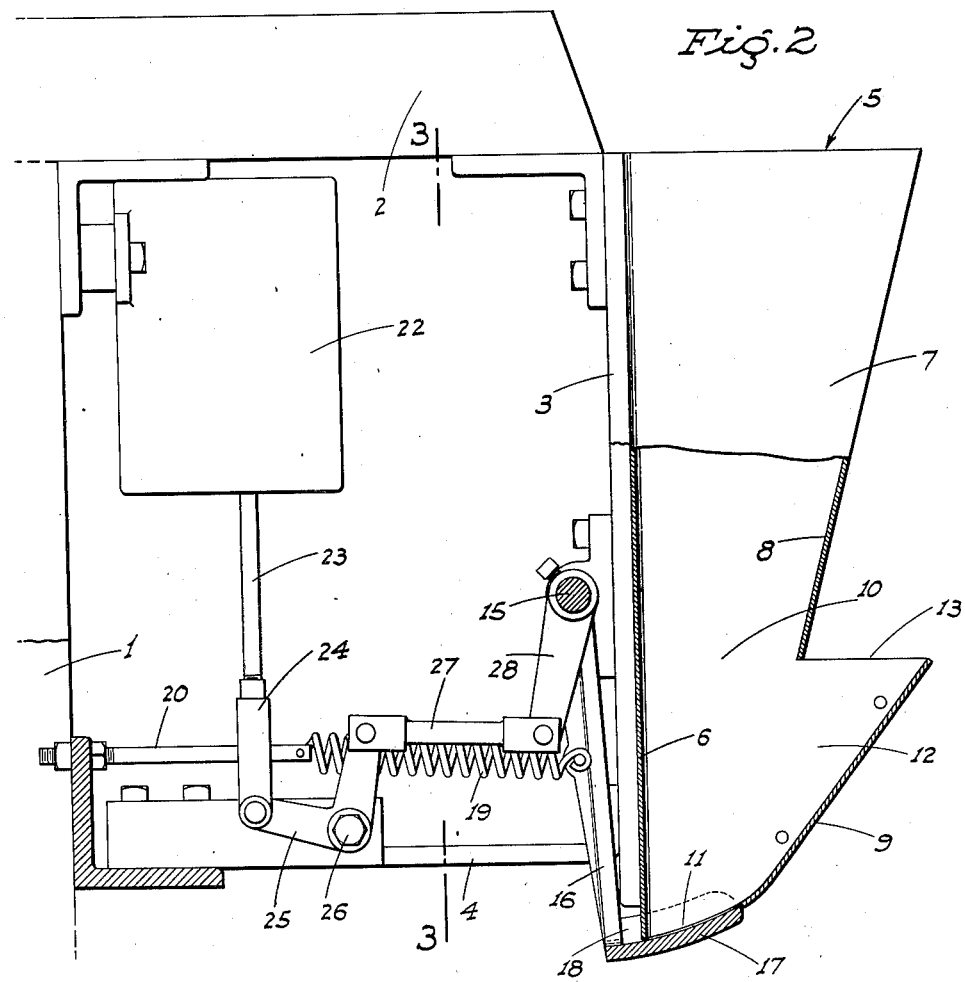
Figure 2 is a similar view, but illustrates the gate in closed position.
Figure 3:
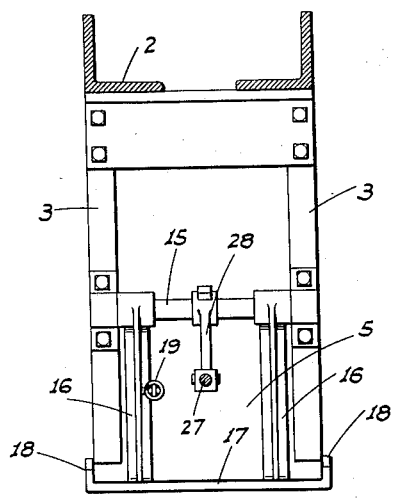
Figure 3 is a cross section, on reduced scale, taken on line 3—3 of Fig. 2.

A gate unit is mounted in cooperative relation to the bottom discharge 11, and comprises the following:

A horizontal cross shaft 15 is journaled in connection with and extends between the front bars 3 rearwardly of the hopper, and a pair of transversely spaced rigid arms 16 are fixed on and depend from the shaft 15 between the tie bars 4. At their lower ends the arms 16 are secured to a gate 17 which is of a width slightly greater than the hopper, and projects forwardly from said arms. The upper face of the gate 17 is concentric to the axis of shaft 15, and the lower edges of side plates 7 are likewise concentric and run in close matching relation to the top surface of the gate 17 when the latter is swung to closed position, as shown in Fig. 2. Side flanges 18 on the gate 17 lap the side plates 7 at the bottom when said gate is closed. By reason of the particular construction of the gate unit, i. e., the projection of the gate forwardly from the arms 16, and the positioning of the shaft 15 to the rear of the bottom discharge opening 11, said gate unit tends to open by gravity, and to the open position shown in Fig. 1. However, to assure that the gate unit positively and normally remains open, a tension spring 19 is connected between one of the arms 16 intermediate its ends and an anchor rod 20 which projects forwardly from the upstanding frame 1.

The gate unit is adapted to be closed by the following power mechanism:

A solenoid 21 is supported in a case 22 fixed in connection with the upstanding frame 1 beneath the top beams 2, said solenoid including a downwardly projecting solenoid plunger 23 provided at its lower end with a clevis 24. The clevis 24 is pivotally connected to the outer end of one leg of a bellcrank lever 25 swingably mounted by a pivot bolt 26; the other leg of said bellcrank lever projecting upwardly. A link 27 pivotally connects between the upper end of said other leg of the bellcrank lever and a radial arm 28 fixed in connection with and projecting at a rearward and downward incline from the shaft 15.

In operation of the above described hopper assembly material is constantly fed into the hopper 5 from above by means not here shown, but which may be a feeding device such as is shown in my copending application, Serial No. 585,365, filed March 28, 1945. Such material flows into the hopper 5, through the throat 10, and thence discharges from the opening 11 into the receiver of an automatic weighing machine (not shown) disposed therebelow. When the receiver of the automatic weighing machine is filled with a load of predetermined weight, a circuit is automatically closed, which energizes the solenoid 21, and when this occurs the normally advanced plunger 23 is retracted upwardly by the solenoid, causing the bellcrank lever 25 to be swung in a clockwise direction. In turn the shaft 15 is rotated by the radial arm 28 in a direction to swing the arms 16 toward the hopper, instantaneously shifting the gate 17 from the open position of Fig. 1 to the closed position of Fig. 2.

The gate 17 remains closed until the solenoid 21 is deenergized, and which does not occur until the receiver of the automatic weighting machine has been discharged and is ready to receive another load.

During this lapse of time material continues to flow into the hopper 5 from above, and if the material is of a non-free-flowing type, as are raisins, such material would tend—in a conventional hopper—to accumulate and pack into the hopper to an extent which would cause jamming at and adjacent the bottom discharge opening. In the present hopper assembly, however, such jamming does not occur by reason of the provision of the relief chamber 12 below the throat 10. The forward offset of the lower front plate 9 of the hopper assures against packing or jamming of the material at the bottom of the hopper, provides an ample starting supply when the gate again opens, and in addition the access opening 13 provides for ready inspection of the condition of material in the bottom of said hopper. This offsetting of the lower front plate 9 is one of the essential features of the instant invention, as is the particular gate unit and the manner of its mounting and electric control.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A hopper assembly including a frame, a hopper mounted on the frame, the hopper comprising a vertical rear wall, side walls, and a dual front wall, one front wall inclining from its upward edge downwardly and inwardly toward the vertical rear wall to a point intermediate the upper and lower edges of such rear wall to there form a throat, the second front wall having its upper edge laterally out from the lower edge of the first front wall and in substantially the same horizontal plane thereof, such second front wall inclining downwardly toward the vertical rear wall to a point spaced from the lower edge of such rear wall to form a discharge opening, and a gate operable to close said discharge opening.

2. An assembly as in claim 1 in which the space between the lower edge of the first front wall and the upper edge of the second front wall is freely open.

3. A hopper assembly including a supporting frame, a hopper secured to the frame, such hopper having a vertically disposed rear wall and a discharge outlet at its lower end, a shaft journaled in the frame to the back of the rear wall of the hopper and transversely thereof, an arm fixed to said shaft and depending below the same, a gate on the lower end of said arm operable to close and open the discharge outlet in the hopper with the swinging of the arm, a tension spring connected between the arm and an opposite part of the frame and functioning to normally hold the gate clear of the discharge outlet of the hopper, a substantially horizontally disposed link operatively connected with the shaft for turning the same to swing the arm, a bell crank lever pivoted in the frame, one leg of the lever extending substantially vertically and being connected with the outer end of the link, a vertically disposed solenoid mounted in the frame above the bell crank lever, the plunger of the solenoid depending below the same and being connected with the other end of the bell crank.

EDWARD J. VAGIM.

REFERENCES CITED

The following references are of record in the file of this patent:

UNITED STATES PATENTS

| Number | Name | Date |
|---|---|---|
| 1,051,273 | Sandberg | Jan. 21, 1913 |
| 1,251,397 | MacLauchlan | Dec. 25, 1917 |
| 1,857,734 | Moldovan et al. | May 10, 1932 |
| 1,981,697 | Hartmann | Nov. 20, 1934 |
| 1,983,093 | Montgomery | Dec. 4, 1934 |
| 1,988,122 | Horkavi | Jan. 15, 1935 |
| 2,019,502 | Osgood | Nov. 5, 1935 |
| 2,179,120 | Firehammer | Nov. 7, 1939 |
| 2,335,364 | Slaubaugh | Nov. 30, 1943 |
| 2,381,505 | Lindholm | Aug. 7, 1945 |

FOREIGN PATENTS

| Number | Country | Date |
|---|---|---|
| 18,179/34 | Australia | June 26, 1934 |